United States Patent
Wang et al.

(10) Patent No.: US 10,803,875 B2
(45) Date of Patent: Oct. 13, 2020

(54) SPEAKER RECOGNITION SYSTEM AND METHOD OF USING THE SAME

(71) Applicant: NEC Corporation, Tokyo (JP)

(72) Inventors: Qiongqiong Wang, Tokyo (JP); Koji Okabe, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 53 days.

(21) Appl. No.: 16/270,597

(22) Filed: Feb. 8, 2019

(65) Prior Publication Data

US 2020/0258527 A1 Aug. 13, 2020

(51) Int. Cl.
*G10L 17/18* (2013.01)
*G10L 17/06* (2013.01)
*G10L 17/04* (2013.01)
*G10L 17/02* (2013.01)

(52) U.S. Cl.
CPC .............. *G10L 17/18* (2013.01); *G10L 17/02* (2013.01); *G10L 17/04* (2013.01); *G10L 17/06* (2013.01)

(58) Field of Classification Search
CPC ......... G10L 17/18; G10L 17/02; G10L 17/04; G10L 17/06
See application file for complete search history.

(56) References Cited

U.S. PATENT DOCUMENTS

| 10,445,429 B2* | 10/2019 | Seyed Ibrahim ..... G06F 40/205 |
| 2005/0065793 A1 | 3/2005 | Choi et al. |
| 2015/0149165 A1 | 5/2015 | Saon |
| 2015/0154002 A1* | 6/2015 | Weinstein ............ G06F 40/109 715/728 |
| 2017/0169815 A1* | 6/2017 | Zhan ....................... G10L 15/14 |
| 2019/0156837 A1* | 5/2019 | Park ..................... G06N 3/0454 |

FOREIGN PATENT DOCUMENTS

| EP | 2216775 A1 | 8/2010 |
| WO | 96/22514 A2 | 7/1996 |
| WO | 2015/148237 A1 | 10/2015 |

OTHER PUBLICATIONS

Najim Dehak, Patric J, Kennym Reda Dehak, Pierre Dumouchel, Pierre Ouellet., Front-end factor analysis for speaker verification,IEEE Transactions on Audio, Speech, and Language Processing, May 2011, pp. 788-798, vol. 19, No. 4, 11pp.

(Continued)

*Primary Examiner* — Nafiz E Hoque
(74) *Attorney, Agent, or Firm* — Hauptman Ham, LLP (57) ABSTRACT

A speaker recognition system includes a non-transitory computer readable medium configured to store instructions. The speaker recognition system further includes a processor connected to the non-transitory computer readable medium. The processor is configured to execute the instructions for extracting acoustic features from each frame of a plurality of frames in input speech data. The processor is configured to execute the instructions for calculating a saliency value for each frame of the plurality of frames using a first neural network (NN) based on the extracted acoustic features, wherein the first NN is a trained NN using speaker posteriors. The processor is configured to execute the instructions for extracting a speaker feature using the saliency value for each frame of the plurality of frames.

20 Claims, 5 Drawing Sheets

(56) References Cited

OTHER PUBLICATIONS

David Snyder, Daniel Garcia-Romero, Daniel Povey, Sanjeev Khudanpur., Deep Neural Network Embeddings for Text-Independent Speaker Verification, Proceedings of Interspeech, 2017, 5pp.
International Search Report in PCT Application No. PCT/JP2020/005423, dated May 12, 2020, 2pp.
Koji Okabe et al., "Attentive Statistics Pooling for Deep Speaker Embedding", Proc. Interspeech 2018, Sep. 2, 2018, pp. 2252-2256, Section 3, 5pp.
Qiongqiong Wang et al., "Attention Mechanism in Speaker Recognition: What Does It Learn in Deep Speaker Embedding?", Proc. 2018 IEEE Spoken Language Technology Workshop (SLT), Dec. 18, 2018, pp. 1052-1059, Section 2, 8pp.

* cited by examiner

SPEAKER RECOGNITION SYSTEM AND METHOD OF USING THE SAME

BACKGROUND

In speaker recognition, a system receives a sequence of raw features, also known as acoustic features, having a variable number of frames. A frame is a period of time in which a feature includes data. The raw features are frame-level features meaning that the information is segmented based on time period. The system is expected to output a speaker identity in a speaker identification scheme or genuine/imposter results in a speaker verification scheme. Both of the output speaker identity and genuine/imposter result are determined at an utterance level meaning that an entire set of information, potentially including many frames, is analyzed. To produce such utterance-level outputs from the frame-level input, a pooling process over all valid frames is used in some the speaker recognition systems. Equally weighted pooling is commonly used meaning that every frame of the raw features is given a same importance regardless of a quality of the information in the frame.

Speaker recognition method include ivector-based methods and DNN-based speaker embedding methods. Both of these method use equally weighted pooling i for such obtaining an output of utterance-level speaker recognition results from frame-level information.

In ivector-based methods, from an utterance with an L-frame feature sequence $\{y_1, y_2, \ldots, y_L\}$, an utterance-level feature x is extracted in accordance with $$M = \mu + Tx,$$

where supervector M is generated by concatenating all the $M_c$, $$M_c = \frac{\sum_{t=1}^{L} P(c \mid y_t, \lambda) y_t}{\sum_{t=1}^{L} P(c \mid y_t, \lambda)}.$$

c is the index of Gaussian components in GMM-UBM. All frames are treated equally, just in the manner of summation over all frames $$\sum_{t=1}^{L} *.$$

In DNN-based methods, an average pooling layer gives the same importance to every frame.

SUMMARY

At least one embodiment of this disclosure relates to a neural network which uses a speaker saliency map, so that speaker saliency of each frame is used to weight pooling features from frame-level to utterance-level. Instead of the equal weighted pooling in i-vector and DNN-based methods, the speaker saliency map weights different frames of the raw features differently. Frames which are more beneficial in speaker recognition, i.e., speaker-discriminative, will have more weights than other frames in pooling processes.

BRIEF DESCRIPTION OF DRAWINGS

The drawings together with the detailed description, serve to help explain principles for the inventive speech recognition system and method. The drawings are for illustration and do not limit the application of the technique.

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and alternate example embodiments.

DETAILED DESCRIPTION

Embodiments will be described below with reference to the figures. The following detailed descriptions are merely exemplary in nature and are not intended to limit the disclosure or the application and uses of the disclosure. Furthermore, there is no intention to be bound by any theory presented in the preceding background of the invention or the following detailed description.

Figure 1:
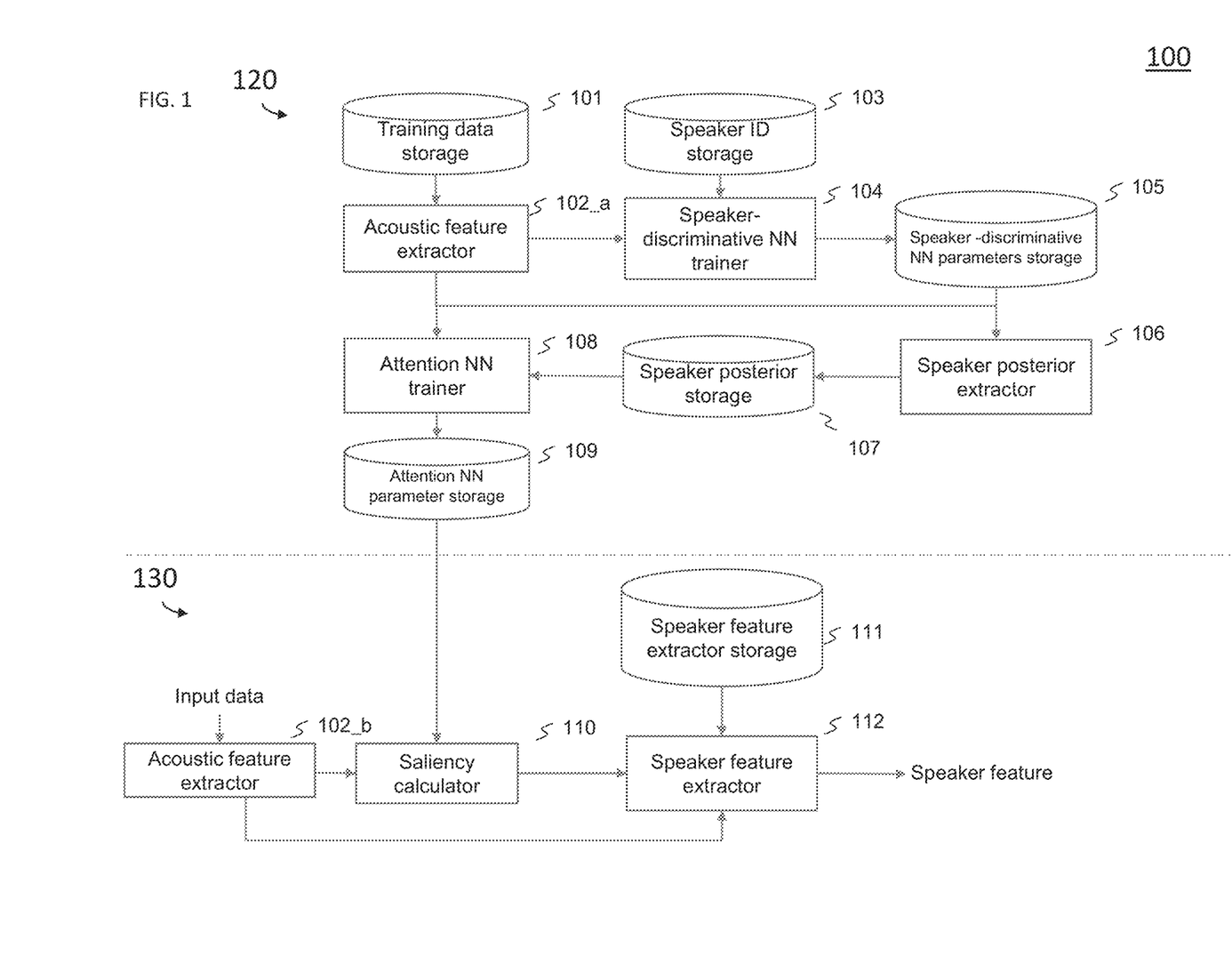
FIG. 1 is a block diagram of a configuration of a speaker recognition system according to at least one embodiment.

FIG. 1 is a block diagram of a configuration of a speaker recognition system 100 according to at least one embodiment. Speaker recognition system 100 includes a training section 120 configured to receive and process raw features. Speaker recognition system further includes a speaker feature extraction section 130 configured to receive input data and output a speaker feature based on information from the training section 120.

The training section 120 includes an acoustic feature extractor 102_a configured to extract acoustic features from the training data received from a training data storage 101 to determine the acoustic information in each of the frames of the training data. A speaker-discriminative neural network (NN) trainer 104 is configured to receive acoustic features from the acoustic feature extractor 102_a and speaker ID information from a speaker ID storage 103. Speaker-discriminative NN trainer 104 outputs speaker-discriminative NN parameters for storage a speaker-discriminative NN parameter storage 105.

Any type of neural network is usable for the speaker-discriminative NN trainer 104, e.g., a Time-Delay Neural Network (TDNN), Convolutional Neural Network (CNN), LSTM, or Gated Recurrent Unit (GRU).

Speaker posterior extractor 106 is configured to extract a target speaker posterior for each speech utterance in the training data storage 101 using the speaker-discriminative NN parameters stored in speaker discriminative NN parameter storage 105. Speaker posteriors extracted by the speaker posterior extractor 106 are stored in a speaker posterior storage 107. In at least one embodiments, the speaker posteriors extracted by the speaker posterior extractor 106 are scalar values ranging from 0 to 1.

Attention NN trainer 108 is configured to receive the acoustic features from acoustic feature extractor 102_a and corresponding speaker posteriors from speaker posterior storage 107. The attention NN trainer 108 is configured to train an attention NN and output attention NN parameters. In at least one embodiment, the attention NN has a single output node. An attention NN parameter storage 109 is configured to store attention NN parameters produced by the attention NN trainer 108.

Any type of neural network is applicable for the attention NN, e.g., a Time-Delay Neural Network (TDNN), Convolutional Neural Network (CNN), LSTM, or Gated Recurrent Unit (GRU). In at least one embodiment, the type of neural network used for attention NN trainer 108 is a same type of neural network as that used for speaker-discriminative NN trainer 104. In at least one embodiment, the type of neural network used for attention NN trainer 108 is a different type of neural network from that used for speaker-discriminative NN trainer 104.

The attention NN parameters stored in attention NN parameter storage 109 are the result of the training section 120 analyzing training data from training data storage 101. The attention NN parameters are usable in order to analyze input data using speaker feature extraction section 130 in order to determine an identity of a speaker of the input data and/or confirm whether the speaker of the input data is an imposter.

Speaker feature extraction section 130 includes an acoustic feature extractor 102_b configured to extract acoustic features from the input data to identify acoustic features for each of the frames of the input data. Acoustic feature extractor 102_a and acoustic feature extractor 102_b have a same function. In at least one embodiment, a same device is used to perform the functions of both acoustic feature extractor 102_a and acoustic feature extractor 102_b. In at least one embodiment, different devices are used to perform the functions of acoustic feature extractor 102_a and acoustic feature extractor 102_b.

The acoustic features from the input data are input to speaker saliency calculator 110. The speaker saliency calculator 110 is configured to calculate the speaker saliency for each frame of the input data using the attention NN parameters stored in attention NN parameter storage 109. Speaker saliency calculator 110 provides a weighting factor for each frame of the input data. The weighting factor is based on the amount of useful information in each frame of the input data. A weighting factor of at least one frame is different from a weighting factor of at least one other frame. In at least one embodiment, each frame of the input data has a distinct weighting factor. In at least one embodiment, at least one frame of the input data has a same weighting factor as at least one other frame of the input data. Examples of frames having a large amount of useful information include frames which include long durations of continuous speech, the use of distinct wording within the frame, or frames with little or no background noise. Examples of frames having a small amount of useful data include frames where the speech is muddled, short durations of speech, multiple speakers speaking at once, or a large amount of background noise. The speaker saliency calculator 110 assigns higher weighting to frames which have a larger amount of useful information. In at least one embodiment, every frame of the input data has a same duration. In at least one embodiments, at least one frame of the input data has a different duration from at least one other frame of the input data.

Speaker feature extractor 112 utilizes the saliencies from the saliency calculator 110 during a pooling process in order to identify a speaker feature. Speak feature extractor 112 also receives speaker feature parameters from a speaker feature extractor storage 111 for use in the pooling process. By including the pooling process within speaker feature extractor 112, the use of fixed NN parameters is avoided. As a result, the speaker feature extractor 112 is able to adjust to a wide variety of input data having different frames which different amounts of usable data. In at least one embodiment, the speaker feature is an identity of the speaker of the input data. In at least one embodiment, the speaker feature is an authentication of a speaker based on a comparison of the input data with stored speaker feature parameters.

Speaker feature extractor 112 is any type of feature extractors which is able to perform at least one pooling process. In at least one embodiment, speaker feature extractor 112 is a deep speaker feature extractor. In at least one embodiment, speaker feature extractor 112 is an i-vector extractor.

In comparison with other approaches which do not include the saliency calculator 110, speaker recognition system 100 is able to provide results with higher accuracy. By weighting different frames of data differently, frames which include a larger about of usable data are given more importance. As a result, speaker recognition system 100 is able to reduce instances of false positives, false negatives and incorrect identification of speakers in comparison with other systems.

Speaker saliency calculator 110 determines the weights to be applied to the different frames of the input data. The input speech utterance $x=(x_1, \ldots, x_L)$ is input to an attention NN, which outputs a scalar score S, for each frame of the input data based on the amount of usable data in the corresponding frame. The gradient of the score with respected to the acoustic features of a frame is $$g = \frac{\partial s}{\partial x_i} = f(W, x),$$

where $x_i$ is the acoustic feature vector at frame i (i=1, ..., L); L is the total number of frames in the speech utterance, x is the matrix of L feature vectors; W is the attention NN parameters trained by the attention NN trainer 108 and stored in the attention NN parameter storage 109. The saliency of frame i is calculated as p-norm of the gradient vector $$\left(\sum_j g_{ij}^p\right)^{\frac{1}{p}},$$

where $g_{ij}$ is the $j^{th}$ element of the gradient $g_i$; p is a parameter to be determined. In at least one embodiment, p is a positive infinity, and the saliency is the maximum element over all dimensions of the gradient vectors. Using the NN parameters W and the input acoustic feature $x_i$, the saliency of each of the frames from the input data is calculated.

In other speaker feature extractors, in which, the statistics pooling layer gets a fixed-dimensional utterance-level representation from frame-level feature vectors of variable length:

$$h = \frac{1}{L}\sum_{i=1}^{L} h_i,$$

where $h_i$ is the bottle neck feature in the frame level, output of the layer before the pooling layer. In contrast, speaker feature extractor 112 calculates weighted average $$h = \frac{1}{\sum_{i=1}^{L} w_i} \sum_{i=1}^{L} w_i h_i,$$

where $w_i$ is determined by the saliency calculator 110. The result is that speaker feature extractor 112 is able to increase the importance placed on frames that have more information resulting in faster determination of the speaker feature with higher accuracy and higher confidence.

The speaker recognition system 100 assigns frames that are more important for speaker recognition higher weights during the saliency calculation. The posterior of a speech utterance being a target speaker or a group of speaker candidates is used to train an attention NN. As a result, the gradients of the attention NN parameters with respect to the frames represents the contribution of the frame to the target speaker posterior, i.e., the importance of the frame for speaker recognition. With the weighted pooling, the resulted speaker feature is expected to have a better recognition of the speaker. Thus, the speaker recognition is expected to be more accurate and provide a higher confidence in the determined speaker feature.

Figure 2:
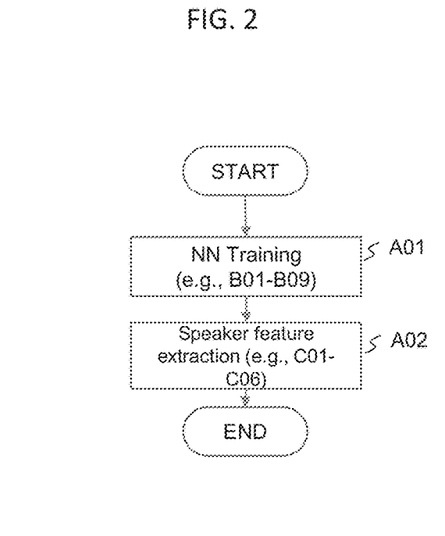
FIG. 2 is a flowchart of operations performed by a speaker recognition system according to at least one embodiment.

FIG. 2 is a flowchart of operations performed by a speaker recognition system according to at least one embodiment. In at least one embodiment, the operations of FIG. 2 are performed by speaker recognition system 100 (FIG. 1). In operation A01, a NN is trained. In operation A02, a speaker feature is extracted based on the training of the NN from operation A01.

In at least one embodiment, NN training is performed for a single iteration. In at least one embodiment, NN training is performed for multiple iterations. In at least one embodiment, NN training is performed prior to speaker feature extraction and again after speaker feature extraction using updated data.

Figure 3:
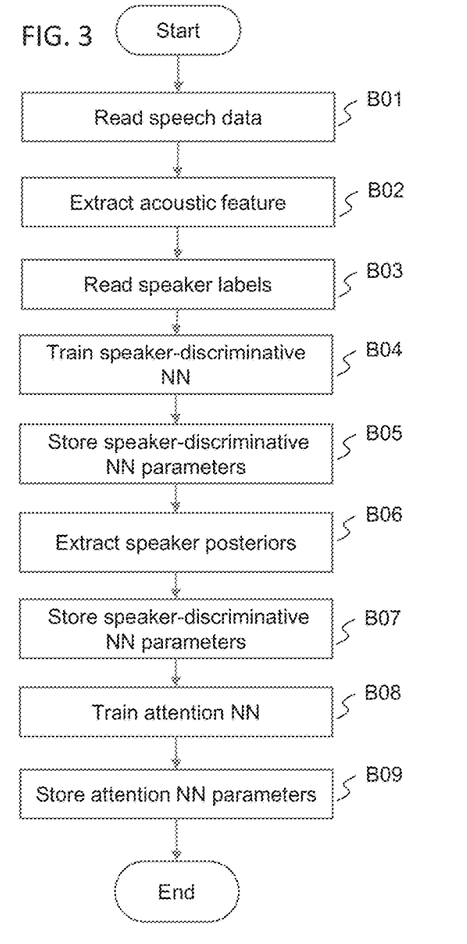
FIG. 3 is a flowchart of operations for training a speaker recognition system according to at least one embodiment.

FIG. 3 is a flowchart of operations for training a speaker recognition system according to at least one embodiment. In at least one embodiment, the operations of FIG. 3 are performed by training section 120 of speaker recognition system 100. In at least one embodiments, the operations of FIG. 3 are details of the NN training A01 of FIG. 2. The following description uses training section 120 as a non-limiting example of the operations of FIG. 3.

In operation B01, acoustic feature extractor 102_a reads speech data stored in training data storage 101. In at least one embodiment, the speech data is standard speech data, e.g., NIST 2006 speaker recognition evaluation (SRE) or 2008 SRE. In at least one embodiment, the speech data is speech data provided in advance by a user based on speaker feature candidates. In at least one embodiment, the speech data is periodically updated as additional speaker feature candidates are added. In at least one embodiment, the acoustic feature extractor 102_a receives the speech data via wireless communication. In at least one embodiment, the acoustic feature extractor 102_a receives the speech data via a wired connection. In at least one embodiment, the acoustic feature extractor 102_a receives the speech data from a server remote from the training section 120.

In operation B02, acoustic feature extractor 102_a extracts acoustic features from the speech data.

In operation B03, speaker-discriminative NN trainer 104 reads the speaker IDs stored in the speaker ID storage 103. In at least one embodiment, the speaker IDs are updated periodically as new speaker candidates are included. In at least one embodiment, speaker IDs are stored in a same device as speech data. In at least one embodiment, speaker IDs are stored in a separate device from a device storing the speech data. In at least one embodiment, the speaker-discriminative NN trainer 104 receives the speaker IDs via wireless communication. In at least one embodiment, the speaker-discriminative NN trainer 104 receives the speaker IDs via a wired connection. In at least one embodiment, the speaker-discriminative NN trainer 104 receives the speaker IDs from a server remote from the training section 120.

In operation B04, speaker-discriminative NN trainer 104 trains a speaker-discriminative NN. The speaker-feature discriminative NN trainer 104 trains the speaker-discriminative NN by determining parameters for nodes with the speaker-discriminative NN based on the read speaker IDs as well as the extracted acoustic features from the speech data. In at least one embodiments, the speaker-discriminative NN is a TDNN, a CNN, an LSTM, a GRU, or another suitable NN. In at least one embodiments, operation B04 is repeated based on updates to the speaker ID storage 103 and/or updates to the training data storage 101.

In operation B05, speaker-discriminative NN parameters generated by the speaker-discriminative NN trainer 104 are stored in speaker-discriminative NN parameters storage 105. In at least one embodiment, speaker-discriminative NN parameters are stored in a same device as speaker IDs and speech data. In at least one embodiment, speaker-discriminative NN parameters are stored in a separate device from a device storing at least one of speaker IDs or the speech data.

In operation B06, speaker posterior extractor 106 extracts speaker posteriors for the speech data. The speaker posterior extractor 106 extracts speaker posteriors based on extracted acoustic features of the speech data from acoustic feature extractor 102_a using the speaker-discriminative NN based on the parameters stored in the speaker-discriminative NN parameters storage 105. In at least one embodiments, the speaker posteriors extracted by the speaker posterior extractor 106 are scalar values ranging from 0 to 1.

In operation B07, speaker posteriors from speaker posterior extractor 106 are stored in speaker posterior storage 107. In at least one embodiment, speaker posteriors are stored in a same device as speaker-discriminative NN parameters, speaker IDs and speech data. In at least one embodiment, speaker posteriors are stored in a separate device from a device storing at least one of speaker-discriminative NN parameters, speaker IDs or the speech data.

In operation B08, attention NN trainer 108 trains an attention NN. The attention NN trainer trains the attention NN using the acoustic features extracted by the acoustic feature extractor 102_a and the stored speaker posteriors from speaker posterior storage 107. In at least one embodiments, the attention NN is a TDNN, a CNN, an LSTM, a GRU, or another suitable NN. In at least one embodiments, the attention NN is a same type of NN as the speaker-discriminative NN. In at least one embodiments, the attention NN is a different type of NN from the speaker-discriminative NN.

In step B09, the attention NN parameters are stored in the attention NN storage 109. In at least one embodiment, attention NN parameters are stored in a same device as speaker posteriors, speaker-discriminative NN parameters, speaker IDs and speech data. In at least one embodiment, attention NN parameters are stored in a separate device from a device storing at least one of speaker posteriors, speaker-discriminative NN parameters, speaker IDs or the speech data.

In at least one embodiment, an order of operations in FIG. 3 are changed. For example, in at least one embodiments, operation B03 occurs prior to operation B01. In at least one embodiment, at least one operation in FIG. 3 is performed simultaneously with another operation. For example, in at least one embodiment, operation B02 is performed simultaneously with operation B03. In at least one embodiment, at least one operation is performed prior to the operations in FIG. 3. For example, in at least one embodiment, speech data is stored in training data storage 101 prior to the operations in FIG. 3. In at least one embodiments, at least one operation is performed after the operations in FIG. 3. For example, in at least one embodiment, a determination is made whether the speech data or speaker ID information is updated following operation B09.

Figure 4:
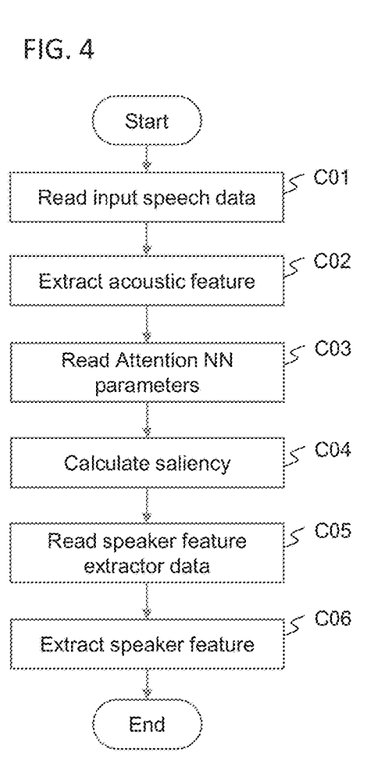
FIG. 4 is a flowchart of operations for extracting a speaker feature according to at least one embodiment.

FIG. 4 is a flowchart of operations for extracting a speaker feature according to at least one embodiment. In at least one embodiment, the operations of FIG. 4 are performed by speaker feature extraction section 130 of speaker recognition system 100. In at least one embodiments, the operations of FIG. 4 are details of the speaker feature extraction A02 of FIG. 2. The following description uses speaker feature extraction section 130 as a non-limiting example of the operations of FIG. 4.

In operation C01, acoustic feature extractor 102_b reads input speech data from input data. In at least one embodiment, the input data is received as a live utterance. In at least one embodiment, the input data is stored in a non-transitory recordable medium for analysis. In at least one embodiment, the input data includes more than one utterance.

In operation C02, acoustic feature extractor 102_b extracts acoustic features from the input speech data. In at least one embodiment, a same device is used to perform operation C02 and operation B02 (FIG. 3). In at least one embodiment, a device used to perform operation C02 is different from a device used to perform operation B02.

In operation C03, saliency calculator 110 reads attention NN parameters from attention NN parameter storage 109. In at least one embodiment, the saliency calculator 110 receives the attention NN parameters via wireless communication. In at least one embodiment, the saliency calculator 110 receives the attention NN parameters via a wired connection. In at least one embodiment, the saliency calculator 110 receives the attention NN parameters from a server remote from the speaker feature extraction section 130.

In operation C04, saliency calculator 110 calculates saliency of each frame of the input speech data. The saliency calculator 110 assigns a weight to each frame of the input speech data, as described above, according to at least one embodiment. By calculating different weights for different frames of the input speech data, the operations in FIG. 4 are able to achieve higher accuracy and higher confidence for extracting the speaker feature in comparison with other methods of speaker recognition.

In operation C05, speaker feature extractor 112 reads speaker feature extractor data stored in speaker feature extractor storage 111. In at least one embodiment, the speaker feature extractor 112 receives the speaker feature extractor data via wireless communication. In at least one embodiment, speaker feature extractor data is stored in a same device as attention NN parameters, speaker posteriors, speaker-discriminative NN parameters, speaker IDs and speech data. In at least one embodiment, speaker feature extractor data is stored in a separate device from a device storing at least one of attention NN parameters, speaker posteriors, speaker-discriminative NN parameters, speaker IDs or the speech data. In at least one embodiment, the speaker feature extractor 112 receives the speaker feature extractor data via a wired connection. In at least one embodiment, the speaker feature extractor 112 receives the speaker feature extractor data from a server remote from the speaker feature extraction section 130.

In operation C06, speaker feature extractor 112 extracts speaker feature using the weights from saliency calculator 110 and the speaker feature extractor data from the speaker feature extractor storage 111. The speaker feature extractor 112 extracts a speaker feature, as described above, according to at least one embodiment. In at least one embodiment, the speaker feature is an identity of a speaker of the input data. In at least one embodiment, the speaker feature is an authentication of a speaker based on a comparison of known speaker IDs with a determined identify of the speaker of the input data.

In at least one embodiment, an order of operations in FIG. 4 are changed. For example, in at least one embodiments, operation C05 occurs prior to operation C04. In at least one embodiment, at least one operation in FIG. 4 is performed simultaneously with another operation. For example, in at least one embodiment, operation C03 is performed simultaneously with operation C05. In at least one embodiment, at least one operation is performed prior to the operations in FIG. 4. For example, in at least one embodiment, input data is stored in a non-transitory computer readable medium prior to the operations in FIG. 4. In at least one embodiments, at least one operation is performed after the operations in FIG. 4. For example, in at least one embodiment, an external device is controlled based on the determined speaker feature by the operations in FIG. 4.

In at least one embodiment, the speaker recognition system 100 and/or the operations in FIGS. 2-4 are usable for controlling an external device (not shown). For example, where the speaker recognition system 100 is used to authenticate a speaker, an authenticated user is provided access to a computer system or physical location; while a non-authenticated user is denied access to the computer system or physical location. In least one embodiment, speaker recognition system 100 is configured to remotely control, via wired or wireless communication, the external device. In at least one embodiment, the speaker recognition system 100 controls the external device to emit an alarm in response to attempted access by a non-authenticated user. By weighting frames differently based on the useful information within the frame, the risk of unauthorized access to the computer system or physical location is reduced. In addition, erroneously preventing access to an authorized user is reduced or avoided by using the weighting scheme of speaker recognition system 100.

In at least one embodiment, the speaker recognition system 100 and/or the operations in FIGS. 2-4 are useable for identifying a speaker of interest for a user. For example, where the user enjoys a speech, the user is able to utilize the speaker recognition system 100 to identify the speaker to enable to user to learn more about the speaker. In at least one embodiment, the speaker recognition system 100 is usable to identify a speaker for the purpose of investigating the speaker. By weighting frames differently based on the useful information within the frame, the accuracy of the search function is increased. In addition, precision in the investigation is increased by using the weighting scheme of speaker recognition system 100.

Figure 5:
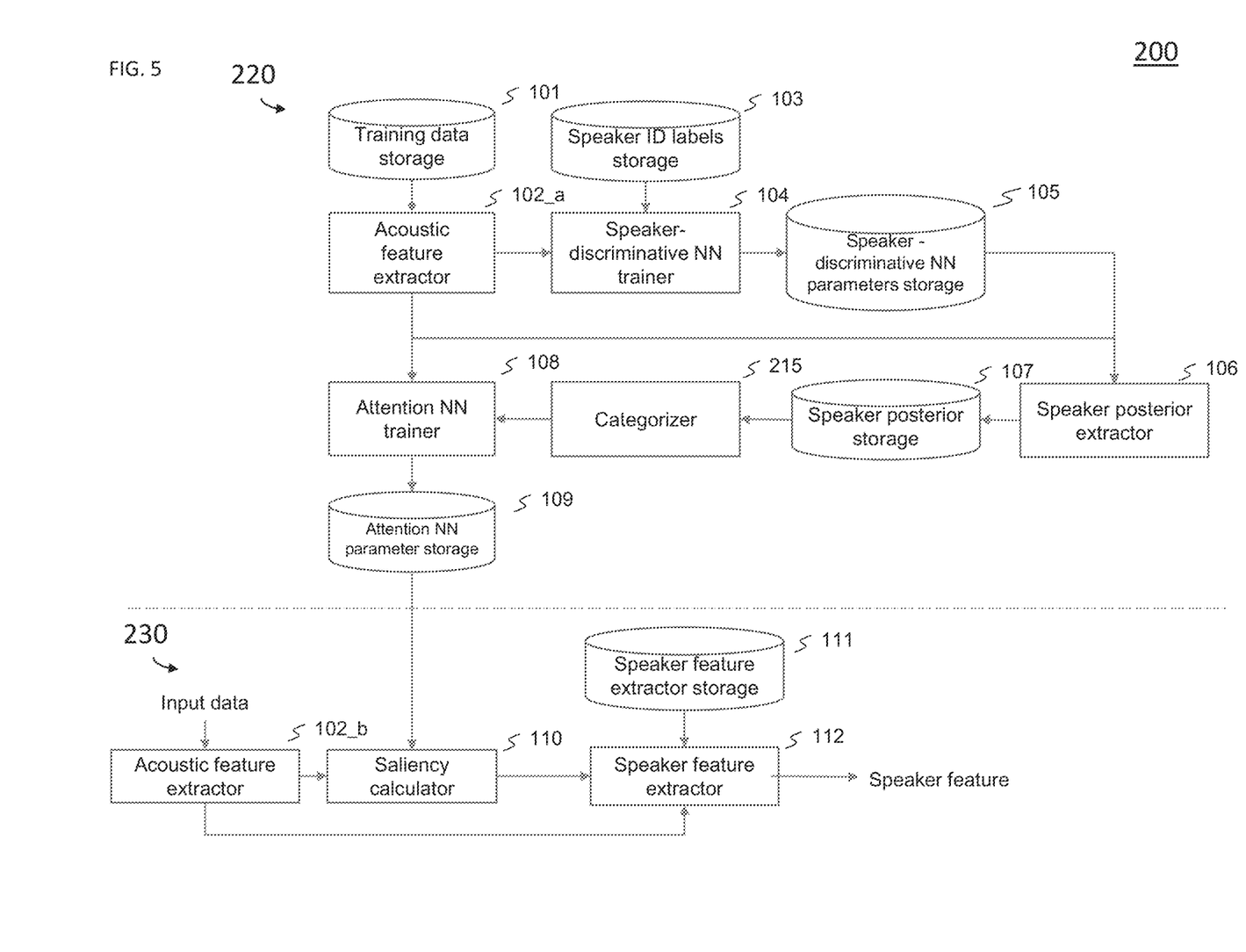
FIG. 5 is a block diagram of a configuration of a speaker recognition system according to at least one embodiment.

FIG. 5 is a block diagram of a configuration of a speaker recognition system 200 according to at least one embodiment. Speaker recognition system 200 includes a training section 220 configured to receive and process raw features. Speaker recognition system 200 further includes a speaker feature extraction section 230 configured to receive input data and output a speaker feature based on information from the training section 220. The speaker recognition system 200 is similar to the speaker recognition system 100 (FIG. 1) and similar elements have a same reference number. Details of same elements from speaker recognition system 100 are omitted here for the sake of brevity.

Training section 220 is similar to training section 120 of speaker recognition system 100 (FIG. 1). In comparison with training section 120, the training section 220 includes a categorizer 215 configured to receive speaker posteriors from speaker posterior storage 107. Categorizer 215 categorizes the speaker posteriors into classes. In at least one embodiment, categorizer 215 categorizes the speaker posteriors into two classes, e.g., class 0 referring to frames have useful data and class 1 referring to frames lacking useful data. In at least one embodiment, categorizer 215 classifies the speaker posteriors into more than two classes based on the amount of useful data in the frames. The categorizer 215 classifies the speaker posteriors based on a comparison with at least one pre-determined threshold. The number of pre-determined thresholds is based on the number of classes into which the categorizer 215 classifies the speaker posteriors.

The attention NN trainer 108 utilizes the classifications from categorizer 215 to train the attention NN. In at least one embodiment, the attention NN in speaker recognition system 200 has only two output nodes, corresponding to class 0 and to class 1. By comparing speaker posteriors stored in speaker posterior storage 207 with a pre-determined threshold, training section 220 is able to more precisely train the attention NN by emphasizing the frames having a larger amount of useful information. As a result, the information provided to speaker feature extraction section 230 is more accurate in comparison with other approaches.

Figure 6:
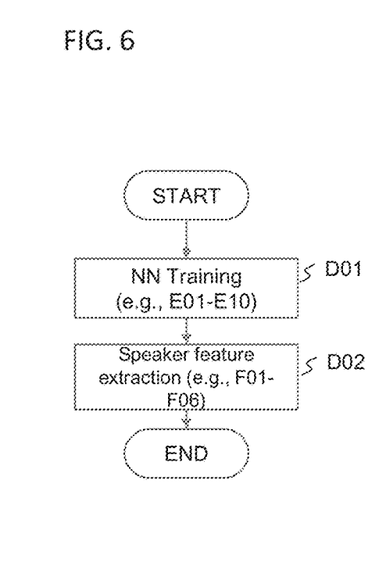
FIG. 6 is a flowchart of operations performed by a speaker recognition system according to at least one embodiment.

FIG. 6 is a flowchart of operations performed by a speaker recognition system according to at least one embodiment. In at least one embodiment, the operations of FIG. 6 are performed by speaker recognition system 200 (FIG. 5). In operation D01, a NN is trained. In operation D02, a speaker feature is extracted based on the training of the NN from operation D01.

In at least one embodiment, NN training is performed for a single iteration. In at least one embodiment, NN training is performed for multiple iterations. In at least one embodiment, NN training is performed prior to speaker feature extraction and again after speaker feature extraction using updated data.

Figure 7:
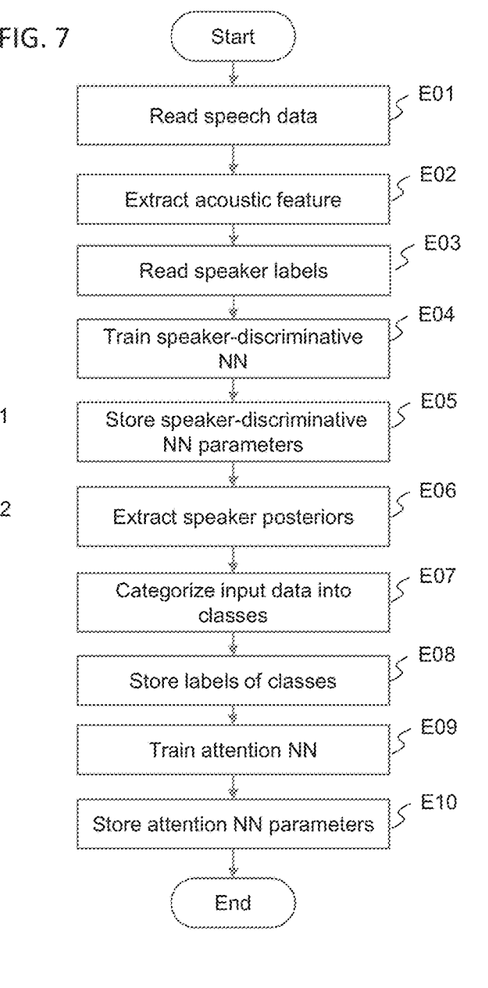
FIG. 7 is a flowchart of operations for training a speaker recognition system according to at least one embodiment.

FIG. 7 is a flowchart of operations for training a speaker recognition system according to at least one embodiment. The operations of FIG. 7 are similar to the operations of FIG. 3. In comparison with operations in FIG. 3, FIG. 7 includes operations for categorizing data into classes E07 and storing labels for classes E08. Operations E01-E06 are similar to operations B01-B06 of FIG. 3, so description of these operations are omitted for the sake of brevity. The following description uses training section 220 as a non-limiting example of the operations of FIG. 7.

In operation E07, categorizer 215 categorizes the posteriors into classes. In at least one embodiment, categorizer 215 categorizes the posteriors into two classes, e.g., class 0 for posteriors equal to or above a threshold value and class 1 for posteriors below the threshold value. In at least one embodiments, categorizer 215 categorizes the posteriors into more than two classes. The classifying is used to distinguish frames which have a large amount of useful information from frames having little or no useful information.

In step E08, categorizer 215 stores the class labels. In some embodiments, the categorizer 215 stores the class labels as part of the information in speaker posterior storage 107. In at least one embodiment, class labels are stored in a same device as speaker posteriors, speaker-discriminative NN parameters, speaker IDs and speech data. In at least one embodiment, class labels are stored in a separate device from a device storing at least one of speaker posteriors, speaker-discriminative NN parameters, speaker IDs or the speech data.

In step E09, attention NN trainer 108 trains an attention NN. The attention NN trainer 108 trains the attention NN using the class labels from categorizer 215 as well as using the acoustic features extracted by the acoustic feature extractor 102_a and the stored speaker posteriors from speaker posterior storage 107. In at least one embodiments, the attention NN is a TDNN, a CNN, an LSTM, a GRU, or another suitable NN. In at least one embodiments, the attention NN is a same type of NN as the speaker-discriminative NN. In at least one embodiments, the attention NN is a different type of NN from the speaker-discriminative NN. By using the class labels to train the attention NN, more importance is placed on frames which have more useful information. As a result, the trained attention NN is usable by a saliency calculator, e.g., saliency calculator 110, more effectively to increase accuracy and confidence in a speaker recognition system.

In step E10, attention NN trainer 209 stores attention NN parameter in storage 210. In at least one embodiment, attention NN parameters are stored in a same device as class labels, speaker posteriors, speaker-discriminative NN parameters, speaker IDs and speech data. In at least one embodiment, attention NN parameters are stored in a separate device from a device storing at least one of class labels, speaker posteriors, speaker-discriminative NN parameters, speaker IDs or the speech data.

In at least one embodiment, an order of operations in FIG. 7 are changed. For example, in at least one embodiments, operation E03 occurs prior to operation E01. In at least one embodiment, at least one operation in FIG. 7 is performed simultaneously with another operation. For example, in at least one embodiment, operation E02 is performed simultaneously with operation E03. In at least one embodiment, at least one operation is performed prior to the operations in FIG. 7. For example, in at least one embodiment, speech data is stored in training data storage 101 prior to the operations in FIG. 7. In at least one embodiments, at least one operation is performed after the operations in FIG. 7. For example, in at least one embodiment, a determination is made whether the speech data or speaker ID information is updated following operation E10.

Figure 8:
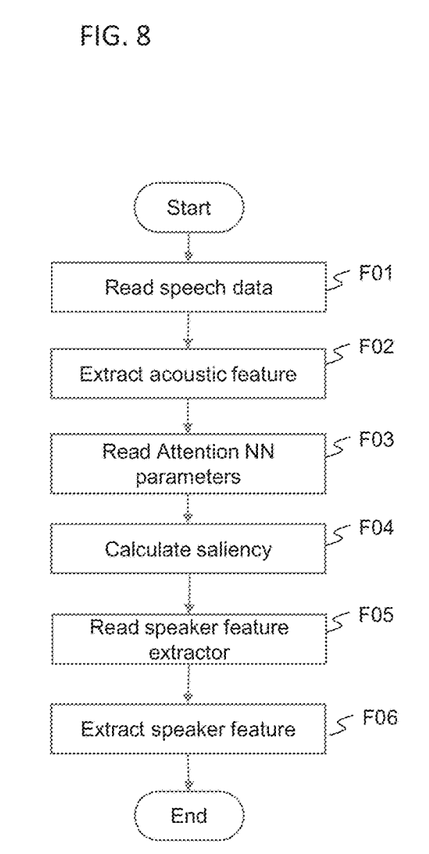
FIG. 8 is a flowchart of operations for extracting a speaker feature according to at least one embodiment.

FIG. 8 is a flowchart of operations for extracting a speaker feature according to at least one embodiment. The operations of FIG. 8 are similar to the operations of FIG. 4. Operations F01-F06 are similar to operations C01-C06 of FIG. 4, so description of these operations are omitted for the sake of brevity.

In at least one embodiment, an order of operations in FIG. 8 are changed. For example, in at least one embodiments, operation F05 occurs prior to operation F04. In at least one embodiment, at least one operation in FIG. 8 is performed simultaneously with another operation. For example, in at least one embodiment, operation F03 is performed simultaneously with operation F05. In at least one embodiment, at least one operation is performed prior to the operations in FIG. 8. For example, in at least one embodiment, input data is stored in a non-transitory computer readable medium prior to the operations in FIG. 8. In at least one embodiments, at least one operation is performed after the operations in FIG. 8. For example, in at least one embodiment, an external device is controlled based on the determined speaker feature by the operations in FIG. 8.

In at least one embodiment, the speaker recognition system 200 and/or the operations in FIGS. 6-8 are usable for controlling an external device (not shown). For example, where the speaker recognition system 200 is used to authenticate a speaker, an authenticated user is provided access to a computer system or physical location; while a non-authenticated user is denied access to the computer system or physical location. In least one embodiment, speaker recognition system 200 is configured to remotely control, via wired or wireless communication, the external device. In at least one embodiment, the speaker recognition system 200 controls the external device to emit an alarm in response to attempted access by a non-authenticated user. By weighting frames differently based on the useful information within the frame, the risk of unauthorized access to the computer system or physical location is reduced. In addition, erroneously preventing access to an authorized user is reduced or avoided by using the weighting scheme of speaker recognition system 200.

In at least one embodiment, the speaker recognition system 200 and/or the operations in FIGS. 6-8 are useable for identifying a speaker of interest for a user. For example, where the user enjoys a speech, the user is able to utilize the speaker recognition system 200 to identify the speaker to enable to user to learn more about the speaker. In at least one embodiment, the speaker recognition system 200 is usable to identify a speaker for the purpose of investigating the speaker. By weighting frames differently based on the useful information within the frame, the accuracy of the search function is increased. In addition, precision in the investigation is increased by using the weighting scheme of speaker recognition system 200.

Figure 9:
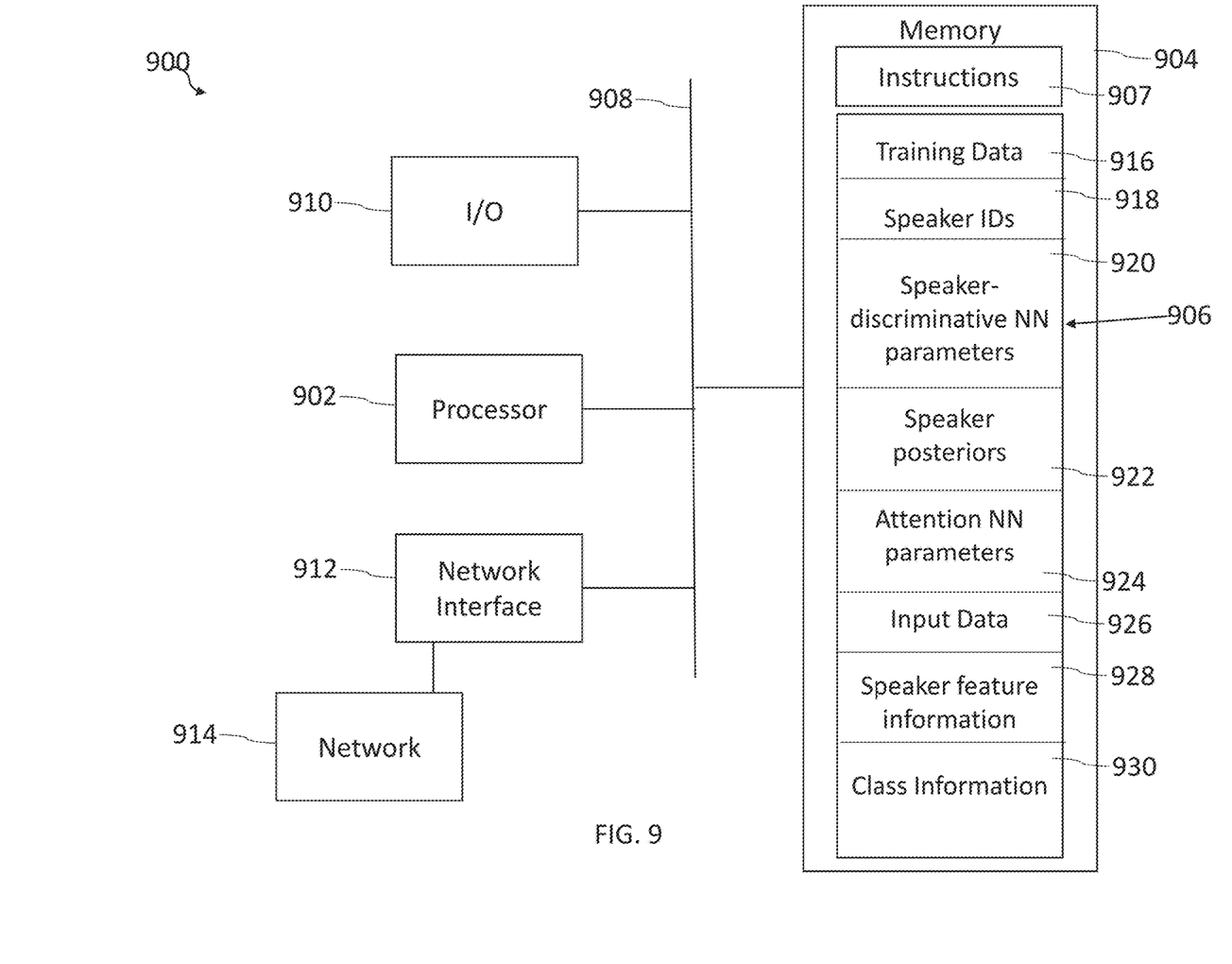
FIG. 9 is a block diagram of a computing device for implementing a speaker recognition system according to at least one embodiment.

FIG. 9 is a block diagram of a computing device for implementing a speaker recognition system according to at least one embodiment. System 900 includes a hardware processor 902 and a non-transitory, computer readable storage medium 904 encoded with, i.e., storing, parameters 906, i.e., a set of executable instructions for implementing the tasks of a speaker recognition system. Computer readable storage medium 904 is also encoded with instructions 907 for interfacing with external devices or other systems utilized in implementing a speaker recognition system. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the instructions and use parameters 906 in the computer readable storage medium 904 in order to cause system 900 to be usable for performing a portion or all of the operations a speaker recognition system.

In at least one embodiment, the processor 902 is a central processing unit (CPU), a multi-processor, a distributed processing system, an application specific integrated circuit (ASIC), and/or a suitable processing unit.

In at least one embodiment, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In at least one embodiment using optical disks, the computer readable storage medium 904 includes a compact disk-read only memory (CD-ROM), a compact disk-read/write (CD-R/W), and/or a digital video disc (DVD).

In at least one embodiment, the storage medium 904 stores the parameters 906 configured to cause system 900 to perform the operation of a speaker recognition system. In at least one embodiment, the storage medium 904 also stores information needed for performing as a speaker recognition system as well as information generated during operation, such as a training data 916, speaker IDs 918, speaker-discriminative NN parameters 920, speaker posteriors 922, attention NN parameters 924, input data 926, speaker feature information 928, class information 930 and/or a set of executable instructions to perform the operation of a speaker recognition system.

In at least one embodiment, the storage medium 904 stores instructions 907 for interfacing with external devices or other systems for implementing the speaker recognition system. The instructions 907 enable processor 902 to generate instructions readable by the external devices or other systems to effectively implement the operation of the speaker recognition system.

System 900 includes I/O interface 910. I/O interface 910 is coupled to external circuitry. In at least one embodiment, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In at least one embodiment, the speaker recognition system is implemented in two or more systems 900, and information such as memory type, memory array layout, I/O voltage, I/O pin location and charge pump are exchanged between different systems 900 via network 914.

One aspect of this description relates to a speaker recognition system. The speaker recognition system includes a non-transitory computer readable medium configured to store instructions. The speaker recognition system further includes a processor connected to the non-transitory computer readable medium. The processor is configured to execute the instructions for extracting acoustic features from each frame of a plurality of frames in input speech data. The processor is configured to execute the instructions for calculating a saliency value for each frame of the plurality of frames using a first neural network (NN) based on the extracted acoustic features, wherein the first NN is a trained NN using speaker posteriors. The processor is configured to execute the instructions for extracting a speaker feature using the saliency value for each frame of the plurality of frames.

One aspect of this description relates to a speaker recognition method. The speaker recognition method includes receiving input speech data. The speaker recognition method includes extracting acoustic features from each frame of a plurality of frames in the input speech data. The speaker recognition method includes calculating a saliency value for each frame of the plurality of frames using a first neural network (NN) based on the extracted acoustic features, wherein the first NN is a trained NN using speaker posteriors. The speaker recognition method includes extracting a speaker feature using the saliency value for each frame of the plurality of frames.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A speaker recognition system comprising:
   a non-transitory computer readable medium configured to store instructions; and
   a processor connected to the non-transitory computer readable medium, wherein the processor is configured to execute the instructions for:
      extracting acoustic features from each frame of a plurality of frames in input speech data;
      calculating a saliency value for each frame of the plurality of frames using a first neural network (NN) based on the extracted acoustic features, wherein the first NN is a trained NN using speaker posteriors; and
      extracting a speaker feature using the saliency value for each frame of the plurality of frames.

2. The speaker recognition system of claim 1, wherein the processor is configured to execute the instructions for extracting the speaker feature using a weighted pooling process implemented using the saliency value for each frame of the plurality of frames.

3. The speaker recognition system of claim 1, wherein the processor is configured to execute the instructions for training the first NN using the speaker posteriors.

4. The speaker recognition system of claim 3, wherein the processor is configured to execute the instructions for generating the speaker posteriors using training data and speaker identification information.

5. The speaker recognition system of claim 1, wherein the processor is configured to execute the instructions for calculating the saliency value for each frame of the plurality of frames based on the a gradient of the speaker posterior for each frame of the plurality of frames based on the extracted acoustic features.

6. The speaker recognition system of claim 1, wherein the processor is configured to execute the instructions for calculating the saliency value for each frame of the plurality of frames using a first node of the first NN and a second node of the first NN, wherein a first frame of the plurality of frames output at the first node indicates the first frame has more useful information than a second frame of the plurality of frames output at the second node.

7. The speaker recognition system of claim 6, wherein the processor is configured to execute the instructions for calculating the saliency value for each frame of the plurality of frames based on the a gradient of the speaker posterior for each frame of the plurality of frames output at the first node of the first NN based on the extracted acoustic features.

8. The speaker recognition system of claim 1, wherein the processor is configured to execute the instructions for outputting an identity of a speaker of the input speech data based on the extracted speaker feature.

9. The speaker recognition system of claim 1, wherein the processor is configured to execute the instructions for matching a speaker of the input speech data to a stored speaker identification based on the extracted speaker feature.

10. The speaker recognition system of claim 1, wherein the processor is configured to execute the instructions for permitting access to a computer system in response to the extracted speaker feature matching an authorized user.

11. A speaker recognition method comprising:
    receiving input speech data;
    extracting acoustic features from each frame of a plurality of frames in the input speech data;
    calculating a saliency value for each frame of the plurality of frames using a first neural network (NN) based on the extracted acoustic features, wherein the first NN is a trained NN using speaker posteriors; and
    extracting a speaker feature using the saliency value for each frame of the plurality of frames.

12. The speaker recognition method of claim 11, wherein the extracting the speaker feature comprises using a weighted pooling process implemented using the saliency value for each frame of the plurality of frames.

13. The speaker recognition method of claim 11, further comprising training the first NN using the speaker posteriors.

14. The speaker recognition method of claim 13, further comprising generating the speaker posteriors using training data and speaker identification information.

15. The speaker recognition method of claim 11, wherein the calculating the saliency value for each frame of the plurality of frames is based on the a gradient of the speaker posterior for each frame of the plurality of frames based on the extracted acoustic features.

16. The speaker recognition method of claim 11, wherein the calculating the saliency value for each frame of the plurality of frames comprises receiving information from a first node of the first NN and from a second node of the first NN, wherein a first frame of the plurality of frames output at the first node indicates the first frame has more useful information than a second frame of the plurality of frames output at the second node.

17. The speaker recognition method of claim 16, wherein the calculating the saliency value for each frame of the plurality of frames is based on the a gradient of the speaker posterior for each frame of the plurality of frames output at the first node of the first NN based on the extracted acoustic features.

18. The speaker recognition method of claim 11, further comprising outputting an identity of a speaker of the input speech data based on the extracted speaker feature.

19. The speaker recognition method of claim 11, further comprising matching a speaker of the input speech data to a stored speaker identification based on the extracted speaker feature.

20. The speaker recognition method of claim 11, further comprising permitting access to a computer system in response to the extracted speaker feature matching an authorized user.

* * * * *